United States Patent [19]
Ooi et al.

[11] Patent Number: 5,206,746
[45] Date of Patent: Apr. 27, 1993

[54] TRANSPARENT-SCATTERING TYPE OPTICAL DEVICE INCLUDING A PRISM WITH A TRIANGULAR LONGITUDINAL CROSS SECTION

[75] Inventors: Yoshiharu Ooi; Tomoki Gunjima; Yoshinori Hirai, all of Yokohama, Japan

[73] Assignee: Asahi Glass Company Ltd., Tokyo, Japan

[21] Appl. No.: 729,499

[22] Filed: Jul. 12, 1991

[30] Foreign Application Priority Data

Jul. 12, 1990 [JP] Japan ................ 2-182706
Oct. 30, 1990 [JP] Japan ................ 2-290668

[51] Int. Cl.⁵ .................. G02F 1/1335; G02F 5/04
[52] U.S. Cl. ......................... 359/40; 359/49; 359/831; 359/833
[58] Field of Search .............. 359/40, 49, 831, 833

[56] References Cited

U.S. PATENT DOCUMENTS

| | | | |
|---|---|---|---|
| 3,791,716 | 2/1974 | Borel et al. | 359/40 |
| 4,708,439 | 11/1987 | Ishii et al. | 359/40 |
| 4,726,662 | 2/1988 | Cromack | 359/40 |
| 4,822,145 | 4/1989 | Staelin | 359/40 |
| 4,832,458 | 5/1989 | Fergason et al. | 359/51 |
| 4,838,660 | 6/1989 | Fergason | 359/51 |
| 5,018,835 | 5/1991 | Dorschner | 359/87 |
| 5,042,925 | 8/1991 | Broer et al. | 359/40 |
| 5,061,050 | 10/1991 | Ogura | 359/831 |

FOREIGN PATENT DOCUMENTS

| | | |
|---|---|---|
| 50-81797 | 7/1975 | Japan . |
| 2-05825 | 8/1990 | Japan ............ 359/63 |

Primary Examiner—William L. Sikes
Assistant Examiner—Anita Pellman Gross
Attorney, Agent, or Firm—Oblon, Spivak, McClelland, Maier & Neustadt

[57] ABSTRACT

A transparent-scattering type optical device which includes a transparent-scattering type optical element having a layer of transparent-scattering mode optical material whose light scattering characteristics are changed in response to an external input; at least one prism having a bottom surface which is attached to an end portion of the transparent-scattering type optical element, and where the prism has a longitudinal cross section of a shape which is either triangular or triangular with a top portion cut away. A pair of angles formed by two opposite sides of the prism and the bottom surface are between 65° and 90° inclusive where one of the two angles is not equal to 90°. A light absorbing face is formed from an area of the prism surface defined by portions of the two opposite sides of the prism nearest to the top.

20 Claims, 4 Drawing Sheets

TRANSPARENT-SCATTERING TYPE OPTICAL DEVICE INCLUDING A PRISM WITH A TRIANGULAR LONGITUDINAL CROSS SECTION

BACKGROUND OF THE INVENTION

1. Field of the Invention

The present invention relates to a transparent-scattering type optical device using a transparent-scattering type optical element whose light scattering characteristics change in response to an external input and a transparent-scattering type display apparatus using the transparent-scattering type optical device.

2. Discussion of Background

There have been known liquid crystal display elements as display elements whose optical characteristics are changed by the application of voltage. Especially, as liquid crystal optical elements which have widely been practiced, there have been proposed twist nematic (TN) type liquid crystal optical elements in which a pair of polarization films are used, and such liquid crystal optical elements have been used as display elements or various kinds of devices such as watches, electronic calculators, word processors, personal computers and so on.

The TN type liquid crystal optical elements with a pair of polarization films had, however, a disadvantage that when the contrast ratio was increased, there was a great light loss, hence, a dark display was provided. Although such disadvantage does not cause a serious problem in the case of a reflection type liquid crystal optical element which is inclusively used in an outdoor environment, a transparent type liquid crystal optical element which necessitates the use of a back light causes the problem of requiring a large amount of light from a back light in order to obtain a bright display.

On the other hand, as liquid crystal optical elements of a type not using the polarization films or transparent-scattering type liquid crystal optical elements, there have been known dynamic scattering mode (DSM) liquid crystal optical elements. Recently, liquid crystal optical elements using a liquid crystal and polymer composite in which liquid crystal is dispersed and held in a cured matrix has attracted attention. In these transparent-scattering type liquid crystal optical elements, however, light does not go straight on but passes through the optical element at the time of scattering, while light goes straight on and passes through the optical element at the time of passing therethrough. Accordingly, when the transparent-scattering type liquid crystal optical element is used for a reflection type, the background at the side of an observer easily appears in a transparent portion. On the other hand, when the optical element is used for a transparent type, the background behind the optical element is seen in the transparent portion. Thus, in both cases, the visibility of the optical element decreases.

Accordingly, it is desired to realize a transparent-scattering type optical element having a bright, high contrast display.

In order to obtain such transparent-scattering type optical element having a bright, high contrast display, there has been proposed a method of arranging a black absorbing face behind the transparent-scattering type optical element or a method of arranging a louver so that light having strong directivity enters from the backside. For instance, U.S. Pat. No. 4,832,458 describes that a transparent-scattering type optical device having a high contrast can be obtained by arranging a cylindrically-shaped lens behind the transparent-scattering type optical element and by arranging a light absorbing means in the vicinity of the focal point. Further, Japanese Unexamined Patent Publication No. 81797/1975 and U.S. Pat. No. 4,726,662 describe that a prism having a light absorbing face is arranged behind the transparent-scattering type optical element.

In the transparent-scattering type optical device disclosed in U.S. Pat. No. 4,832,458, it is necessary to increase the width of the light absorbing means which is disposed in the vicinity of the focal point which is the opposite side with respect to an observer looking through the lens, in order to increase the viewing angle of the observer. This causes the amount of light incident from the back side decrease. The optical device disclosed has problems that when the viewing angle was set to be ±30° in the vertical direction, i.e. 60°, for instance, loss of the amount of light from an illumination means from the back side of the optical device is large as about 57% or higher; that precisely finished lenses were required and that it was necessary to arrange precisely the light absorbing means in the vicinity of the focal point of each of the lenses.

On the other hand, in the transparent-scattering type optical device using a louver, the back side in the range of the viewing angle of the observer can be a light absorbing face for the louver. In this case, it is impossible to set the viewing angle to face the front. Namely, it is necessary to set the viewing angle in the direction slightly inclined with respect to the front face of the optical device.

In the transparent-scattering type optical device disclosed in Japanese Unexamined Patent Publication No. 81797/1975, a prism with a light absorbing film is arranged so as to cause the total reflection of light from the illumination means disposed at the back side, on the front surface of the front side glass plate, whereby the light from the illumination means at the back side does not directly reach the observer. In this optical device, although the viewing angle is broadened, a bright display can not be achieved.

U.S. Pat. No. 4,726,662 describes a transparent-scattering type optical device having a trigonal prism or a cone-like prism having a face which functions as a light absorbing face.

FIGS. 3 and 4 are respectively side views of some examples disclosed in the U.S. Patent. In FIG. 3, reference numeral 21 designates a transparent-scattering type optical element, numeral 22 designates a trigonal prism having a right-angled triangle in cross section, numeral 24 designates a side of the triangle, numeral 25 designates another side which functions as a light absorbing face and numerals 29A, 29B designate the bottom of the valley portions of prisms which are arranged in a side-by-side relation. In FIG. 4, numeral 31 designates a transparent-scattering type optical element, numeral 32 designates a quadrangle cone-like prism having a right angle at its top, numeral 34 designates a side of the prism, numeral 35 designates another side which functions as a light absorbing face and numerals 39A, 39B designate the bottom of the valley portions of prisms which are arranged in a side-by-side relation.

In the case of using the trigonal prism as shown in FIG. 3, the viewing angle of an observer is substantially 90° in the lower direction, while when the prism is inverted, the viewing angle is 90° in the upper direction.

Accordingly, the optical device disclosed in the U.S. Patent is not suitable for use in the case where an observer looks through the optical device from the front. Further, when a colored layer has to be strictly formed only on the entire surface of the light absorbing face 25 of the prism, or when a reflection layer has to be strictly formed only on the entire surface of the side surface 24, there is a danger that the colored layer or the reflection layer may extend to the adjacent surfaces, whereby it is difficult to strictly form the colored layer or the reflection layer, and accordingly, productivity becomes poor.

When the angle $\Psi$ formed by a side face and the bottom surface of the prism is 45°, the average value of the allowable angle of incident light is about 54°, and when an illumination means which emits non-directional light is used, only the maximum transmittance of 30% or lower is obtainable. In addition, light entering in the absorbing surface from the outside of the prism can be reflected in order to utilize it again by forming a reflection layer on the absorbing surface. However, the efficiency is not so large.

When the quadrangle prism as shown in FIG. 4 is used, the viewing angle is substantially 90° in the lower direction. In this case, however, a non-visible condition is not immediately provided in view of the upper side with respect to the horizontal plane but light enters into the dark portion, so that the display portion gradually exhibits gray tone, and finally, the display portion can not be distinguished from the background. Therefore, the transmittance-scattering optical device with the quadrangle prism as shown in FIG. 4 is not suitable for the usage where the viewing angle is required in the direction facing the front. Accordingly, a transparent-scattering type optical device having the viewing angle in the direction facing the front, capable of providing a bright display and being easily manufactured, is expected.

In the prisms as shown in FIGS. 3 and 4, a number of small prisms are generally connected in series in order to reduce the thickness of the device itself and to reduce the difference in view depending on a position for looking through the optical device. However, in the optical device as shown in FIGS. 3 and 4, much labor is required to precisely machine it so that sharp valley bottom portions 29A, 39A between the adjacent prisms can be obtained, and accordingly, the productivity becomes poor. The valley bottom portion tends to show a part of a circle in cross section as indicated by reference numerals 29B, 39B. When the shape of the valley bottom portion is circular in cross section, ideal transmittance-reflection characteristics can not be obtained at the valley bottom portion and a desired contrast ratio is not obtained. Namely, when the above-mentioned optical device is used for a display apparatus, a sufficient contrast ratio for display and viewing angle characteristics which has been initially expected can not be obtained. Accordingly, a transparent-scattering type optical device having transmittance-reflection characteristics close to designed values, especially, a desired contrast ratio and desired viewing angle characteristics is desired.

SUMMARY OF THE INVENTION

The present invention is to eliminate the above-mentioned problems, and to provide a transparent-scattering type optical device comprising a transparent-scattering type optical element having a layer of transparent-scattering mode optical material whose light scattering characteristics are changed in response to an external input and at least one prism having the base surface which is attached to a surface of said transparent-scattering type optical element, characterized in that said prism is of a type that the shape in the longitudinal cross section is triangular or of a type that a part including the top of a triangular shape in cross section is cut; the angles $\Psi_1$ and $\Psi_2$ of the two side faces of the prism to the bottom surface are respectively $65° \leq \Psi_1 \leq 90°$ and $65° \leq \Psi_2 \leq 90°$ where either of $\Psi_1$ and $\Psi_2$ is not an angle of 90°; and an area including the top and the sides in the neighborhood of the top of the triangular prism function as an absorbing face.

In accordance with the present invention, there is provided a transparent-scattering type optical device having a prism which is arranged in the rear of a transparent-scattering mode optical material layer for the transparent-scattering type optical device whose light scattering characteristics vary in response to an external input so that the bottom surface of said prism is in close-contact with the rear surface of the transparent-scattering type optical device, characterized in that two or more prisms are provided in a side-by-side relation, each being of a type that the shape in the longitudinal cross section is triangular or a type that a part around the top of a triangular shape is cut away, and the recessed bottom portion of the two adjacent prisms functions as an absorbing face.

In accordance with the present invention, there is provided a transparent-scattering type display apparatus having a prism which is arranged in the rear of a transparent-scattering mode optical material layer for the transparent-scattering type optical device which has patterned electrodes and whose light scattering characteristics are changed depending on the electrodes in response to an external input so that the bottom surface of the prism is in close-contact with said transparent-scattering type optical device, characterized in that said prism is of a type that the shape in the longitudinal cross section is triangular or of a type that a part including the top of a triangular shape in cross section is cut away; the angles $\Psi_1$ and $\Psi_2$ of the two side faces of the prism to the bottom surface are respectively $65° \leq \Psi_1 \leq 90°$ and $65° \leq \Psi_2 \leq 90°$ where either of $\Psi_1$ and $\Psi_2$ is not an angle of 90°; and an area including the top and the sides in the neighborhood of the triangular prism functions as an absorbing face.

In the transparent-scattering type optical devices in accordance with the present invention, a transparent-scattering type optical element having a layer of transparent-scattering mode optical material whose light scattering characteristics are changed in response to an external input is used. A plurality of prisms each having a triangular shape in cross section and having the side face, as a light absorbing face, in the vicinity of the top portion of the prism are juxtaposed at the back side of the transparent-scattering mode optical material layer so that the bottom surface of each of the prisms is substantially parallel to the transparent-scattering mode optical material layer and the angle $\Psi$ formed between the side face and the bottom surface of each of the prisms is $65° \leq \Psi \leq 90°$. Alternatively, a plurality of prisms having a trigonal shape with the top portion cut away, preferably prisms in a trapezoidal shape in cross section with the top portion cut at a plane substantially parallel to the bottom surface wherein the upper surface functions as a light absorbing face, are arranged in juxtaposition. With such arrangement, there is obtainable a transparent-scattering type optical device having a symmetric viewing angle with respect to the front face, capable of reducing the loss of the light volume of the illumination means disposed at the back side of the optical device, and providing a bright display and a high contrast ratio.

In the transparent-scattering type optical device disclosed in the aforementioned U.S. Pat. No. 4,726,662, the triangular-shaped prisms or the cone-like prisms each having a face which functions as a light absorbing face are arranged at the back side of the transparent-scattering mode optical material layer. Accordingly, the viewing angle does not direct the front face but it inclines toward either direction from the front face.

On the other hand, the transparent-scattering type optical device is so formed that the angle $\Psi$ formed between the side face and the bottom surface of the prism having a triangular shape in cross section is $65° \leq \Psi \leq 90°$, and the light absorbing face is formed in the vicinity of the top portion. Accordingly, light passing straight through a transparent portion of the transparent-scattering type optical element enters into the prism having a triangular shape in cross section from its bottom surface. The light is either reflected on a side face of the prism or directly reaches the light absorbing face in the side face in the vicinity of the top portion, or reaches the light absorbing face at the upper face when it is formed, whereby only part of the light is reflected and returned to the eyes of an observer, and therefore, the portion which reflects the light looks dark. The prism having a triangular shape in cross section may be a trigonal prism or a cone-like prism having a triangular shape in cross section.

In the present invention, by forming the light absorbing face at the portion in the vicinity of the top of the prism having a triangular shape in cross section, it is possible to direct the viewing angle to the front face in comparison with a case wherein the entire portion of a side face functions as a light absorbing face.

In the present invention, of the side faces of the prism, light enters in the prism through the portion where the light absorbing face or a light shielding face such as a light reflection face is not provided. Accordingly, the light of the illumination means placed at the back side of the transparent-scattering mode optical material layer can be sufficiently utilized and it is possible to obtain a relatively bright display.

In accordance with the present invention, a reflection type display system wherein illumination from the side of an observer is used can be provided by forming a reflection face, which reflects light toward the inside of the prism, in a part of the side face where no absorbing face is formed in the prism. In this case too, it is possible to partially utilize light scattered in the prism, which has entered from the side of the observer, hence, it is possible to obtain a relatively bright display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Preferred embodiments of the present invention will be described with reference to the drawings.

Figure 1:
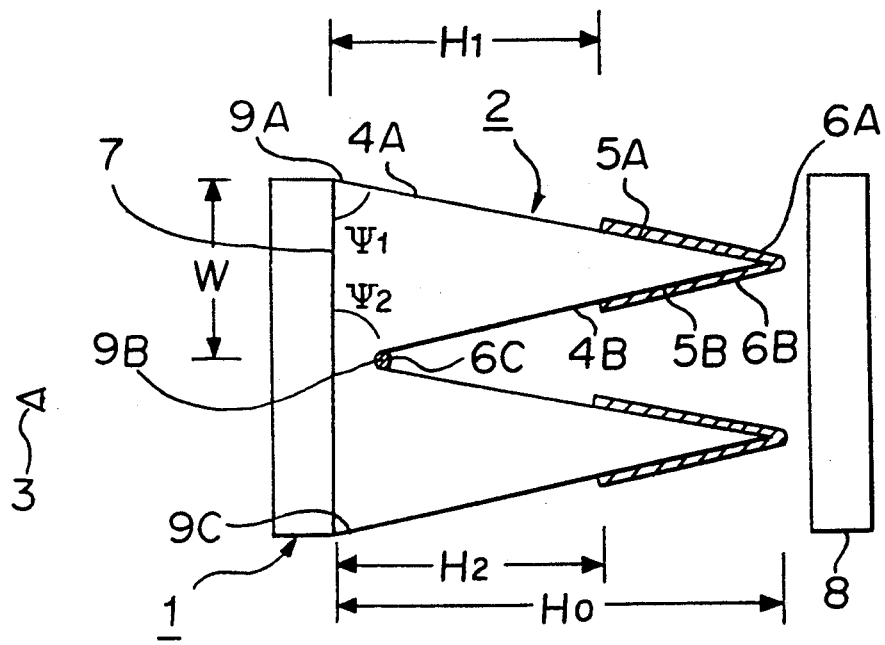
FIGS. 1 and 2 are respectively cross-sectional views showing the basic construction of the transparent-scattering type optical device according to the present invention.

FIG. 1 shows a cross-sectional view of an embodiment of the transparent-scattering type optical device of the present invention wherein a prism having a triangular shape in cross section is used. In FIG. 1 as well as FIG. 2, two prisms are arranged in the vertical direction in order to provide easy explanation. However, in fact, a number of prisms are arranged in juxtaposition in the vertical direction or the direction of depth.

In FIG. 1, a reference numeral 1 designates a transparent-scattering type optical element, numeral 2 designates a prism having a triangular shape in cross section which is disposed at the back side of the transparent-scattering optical element, numeral 3 designates an observer, numerals 4A, 4B designate side faces of the prism, numerals 5A, 5B designate light absorbing faces formed on the side faces, numerals 6A, 6B designate colored layers provided at the absorbing faces, numeral 7 designates the bottom surface of the prism, numeral 8 designates an illumination means disposed in the rear of the prisms, numerals 9A, 9C designate end portions near the bottom surface of the side faces of the prism, numeral 9B designates a valley bottom portion which is the connecting portion of the side face of adjacent prisms, and numeral 6C designates a colored layer formed at the valley bottom portion.

In FIG. 1, symbols $\Psi_1$ and $\Psi_2$ designate respectively angles formed between the side faces and the bottom surface of the prism having a triangular shape in cross section, a symbol $H_0$ designates a length from the bottom surface to the top of the prism, symbols $H_1$ and $H_2$ respectively designate lengths from the bottom surface of the prism to the lower ends of the absorbing faces, and symbol W represents the width of the bottom surface.

The prism having a triangular shape in cross section may be a trigonal prism wherein the angles formed between the two side faces and the bottom surface are respectively $65° \leq \Psi \leq 90°$ ($\Psi = \Psi_1, \Psi_2$) where either of the angles is not 90°, or a cone-like prism wherein the angles $\Psi$ formed by the side faces and the bottom surface on a plane which is perpendicular to any of the side faces and the bottom surface of the cone-like prism are respectively $65° \leq \Psi \leq 90°$ where either of the angles is not 90°. As the cone-like prism, a square cone-like prism is generally used. However, a trigonal cone-like prism or a hexagonal cone-like prism may be used as far as a plurality of the prisms can be arranged in juxtaposition. When prisms are used for picture elements in a dot-matrix form, cone-like prisms each having the bottom surface corresponding in shape to that of the picture element may be used. In this case, prisms connected in series so as to strictly cover the entire portion of the back face of the transparent-scattering optical element is not required but prisms to cover the entire portion of the picture elements may be used. Accordingly, circular cone-like prisms can be used. Especially, from the viewpoint of the viewing angle, the angles formed between the side faces and the bottom surface are preferably $65° \leq \Psi \leq 87°$ respectively, particularly $75° \leq \Psi \leq 87°$.

The light absorbing face is formed at the neighborhood of the top portion of each of the side faces. In this case, it is preferable to form the absorbing face at the position to have relations of $H_1/H_0$ and $H_2/H_0$ of 30%–70%. Namely, when a trigonal prism is used, the above-mentioned relations are provided at its two side faces. When a square cone-like prism is used, the above-mentioned relations are provided at its four side faces. Since it is desirable that the viewing angle be symmetric with respect to the front face, the angle $\Psi_1$ should be the same as the angle $\Psi_2$, and the above-mentioned value range of the absorbing surface should be the same at each of the side faces.

When each of the prisms is machined with high accuracy, a high contrast ratio is obtainable only by forming the absorbing surfaces at positions near the top portions. However, when machining accuracy is low, it is difficult to form a sharp edge at the valley bottom portion which is at the connecting portion of the two adjacent prisms, and the edge of the valley bottom portion is dull. This tendency is remarkable when each of the prisms is thin. Accordingly, it is impossible to obtain desired transmittance-reflection characteristics at the valley bottom portion. By providing the absorbing layer at the valley bottom portion, however, it is possible to absorb light reaching the valley bottom portion and to suppress the reduction of the characteristics.

It is unnecessary to form the absorbing faces at the edges of the outermost portions, i.e. portions 9A, 9C in FIG. 1 because there is no problem in machining. Accordingly, the absorbing face is formed only at the valley bottom portion 9B between the adjacent prisms. Of course, the absorbing faces may be formed at the outermost edge portions 9A, 9C. It is enough that the absorbing face can absorb light which has reached the absorbing face. For instance, the absorbing face may be formed by coating a colored layer, and then a reflection layer is formed at the outer surface of the colored layer so as to face outside so that the light from the illuminating means placed backside of the transparent-scattering type optical element can be effectively used.

It is preferable from the viewpoint of obtaining brightness that the surface area of projection to the bottom surface of the absorbing face is 50% or lower of the total surface area of the bottom surface. In particular, when the prism having a trapezoidal shape in cross section is used, the surface area of projection is preferably 50% or lower because it is difficult to form the reflection layer on the absorbing face so as to effectively use the light.

When the absorbing faces are formed so that the surface areas of the side faces have the same range, the manufacturing process for the prism can be easy. For instance, the prism can be dipped to a specified depth in a color point bath so as to direct the top portion of the prism downwardly even in a case of using the trigonal prism or the cone-like prism. The absorbing layer at the valley bottom portion can be formed by supplying a color paint along a dispenser line or pouring the color paint at the valley bottom portion while directing the top portion of the prism upward.

Figure 2:
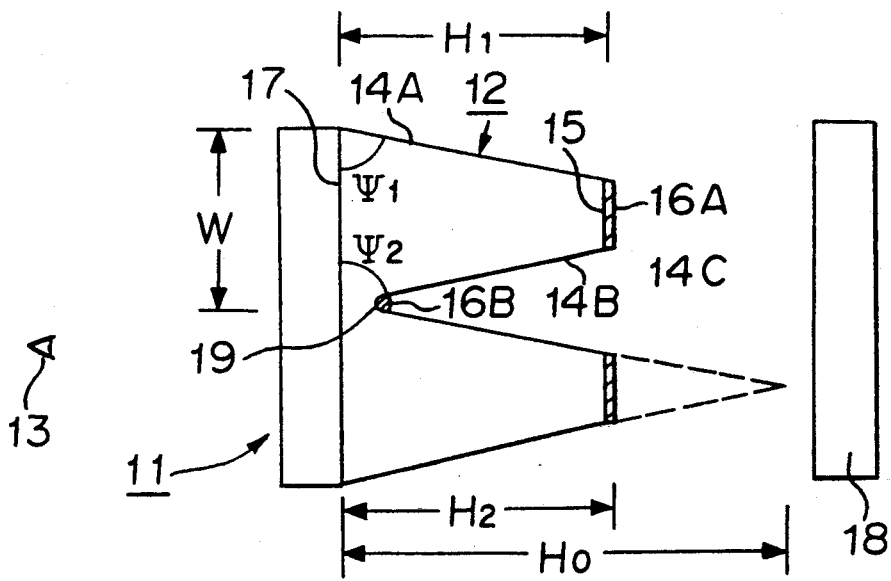

FIG. 2 shows in cross section an embodiment of the transparent-scattering optical device with a prism having a trapezoidal shape in cross section.

In FIG. 2, numeral 11 designates a transparent-scattering type optical element, numeral 12 designates a prism having a triangular shape in cross section which is disposed at the back side of the transparent-scattering type optical element, numeral 13 designates an observer, numerals 14A, 14B designate side faces of the prism, numeral 14C designates the upper surface of the prism, numeral 15 designates an absorbing face at the upper surface of the prism, numeral 16 designates a colored layer formed at the absorbing face, numeral 17 designates the bottom surface of the prism, numeral 18 designates an illumination means disposed at the back side of the prism with respect to the transparent-scattering type optical element, numeral 19 designates a valley bottom portion which is the connecting portion at the bottom side of the side faces of the adjacent prisms, and numeral 16B designates a colored layer formed at the valley bottom portion.

The symbols $\Psi$, $H_0$, $H_1$, $H_2$ are the same as those in FIG. 1 except that $H_0$ is a distance from the bottom surface to the crossing point of the imaginary lines extending along the side faces.

In the embodiment shown in FIG. 2, the prism having a triangular shape in the cross section assumes to take a trigonal shape wherein the neighborhood of the top portion of the trigonal prism is cut. In the specific case as shown in FIG. 2, the prism takes a trapezoidal shape in cross section wherein the top portion is cut by a plane which is parallel to the bottom surface. $H_1$ and $H_2$ represent the positions of cutting the prism and they have the values in the above-mentioned range. It is possible to form the prism so that $H_1$ and $H_2$ have different value, namely, the upper face is inclined. In this case, however, the viewing angle should be symmetric with respect to the front face, and the general shape of the prism should be a trapezoidal form in cross section from the viewpoint of easy manufacturing.

The term "cutting" which has been described does not mean that there is a process of cutting but it shows the final shape. The prism with its top portion cut may be manufactured by, for instance, casting, pressing, injection molding or the like.

It is possible to form the prism so as to have a shape other than the shapes as shown in FIGS. 1 and 2. For instance, the absorbing face may be formed so as to extend not only on the upper face but also to a part of the side face of the prism as shown in FIG. 2 or the upper face of the prism is not flat but has a cone-like shape or a spherical shape.

Figure 3:
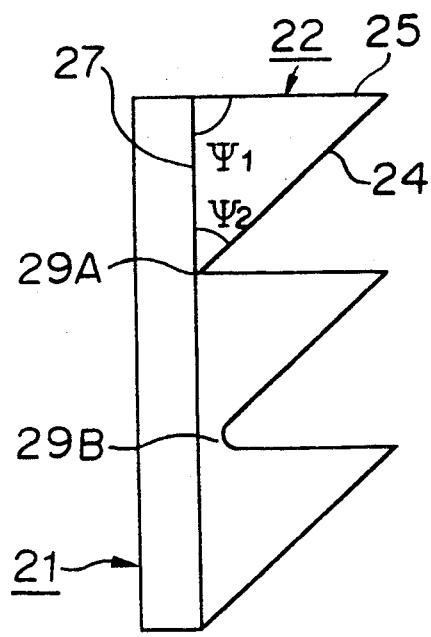
FIGS. 3 and 4 are respectively cross-sectional views showing a conventional transparent-scattering type optical device.

As described before, the optical devices as in FIGS. 1 and 2 comprise a number of small prisms arranged in side-by-side relation in order to make the devices thin or to reduce the difference in view depending on the eye position of an observer. However, in such optical devices, it is difficult to form strictly sharp valley bottom portions, and accordingly, the productivity is greatly reduced. Namely, the sharp valley bottom portions 29A, 39A as shown in FIGS. 3 and can not be obtained, and the valley bottom portions tend to be dull and have an arch shape. The dull valley bottom portions can not provide ideal transmittance-reflection characteristics. If the prism itself is sufficiently larger in comparison with the radius of curvature of the arch, a serious problem may not occur. However, when the size of the prism itself is small, a significant problem arises. Namely, a desired contrast ratio for display and desired viewing angle characteristics can not be obtained. In order to eliminate such problem, the absorbing face is formed at the valley bottom portion so that light reaching the valley bottom portion can be absorbed. With this arrangement, the contrast ratio can be greatly improved although the brightness is more or less reduced.

There has been described the embodiment that the illumination means is disposed at the back side of the prism to thereby utilize the incident light from the back side. However, in accordance with the present invention, the illumination means may be disposed at the side of an observer so that the transparent-scattering type optical device can be used for a reflection type display apparatus. In this case, a reflection face which reflects light toward the inside of the prism is formed on the non-absorbing face at the side face of the prism. When the optical device is used for picture elements arranged in a dot-matrix form, it is preferable that the shape of the bottom surface of the prism corresponds to the shape of the picture element so as to prevent the brightness of specified picture elements from changing due to the scattering condition of the neighboring picture elements.

The transparent-scattering type optical element whose light scattering characteristics are changed in response to an external input, according to the present invention may be a known optical element which provides a transmitting state and a scattering state by the change of the characteristics of the transparent-scattering optical material layer in response to an external input such as voltage, heat, magnetic field or the like. Specifically, a liquid crystal optical element using liquid crystal such as DSM type liquid crystal optical element which utilizes dynamic scattering, a liquid crystal optical element using a liquid crystal polymer composite in which liquid crystal is dispersed and held in a cured matrix, or the like, is preferably used. In particular, the liquid crystal optical element using the liquid crystal polymer composite for the trasparent-scattering optical material layer can provide excellent scattering performance and facilitates controlling the substrate gap and manufacturing because it unnecessary an orientation treatment and it is not in a liquid state. Accordingly, a large-sized device can be realized.

Behind the transparent-scattering optical material layer of the transparent-scattering type optical element, prisms having a triangular shape in cross section are disposed. When trigonal prisms are used, one of the side surfaces, which is assumed to be the bottom surface, of each of the trigonal prisms is closely attached to the back surface of the transparent-scattering type optical element, and other two side faces are directed backward. The crossing point of the lines extending along the two side faces constitutes the top portion, and the light absorbing faces are formed on both side faces near the top portion.

When the cone-like prisms are used, the bottom surface of each of the prisms is closely attached to the back surface of the transparent-scattering type optical element, and each of the side faces near the top portion of each of the prisms is used as the light absorbing face.

The prism having a triangular shape in cross section may have a shape wherein the top portion of the triangle is cut. The portion except the absorbing face on the side faces of the prism having a triangular shape in cross section causes the total reflection of light within the viewing angle, which enters from the side of an observer. The major part of the light reflected at the side faces reaches the absorbing face at the side faces or the upper face.

Figure 5:
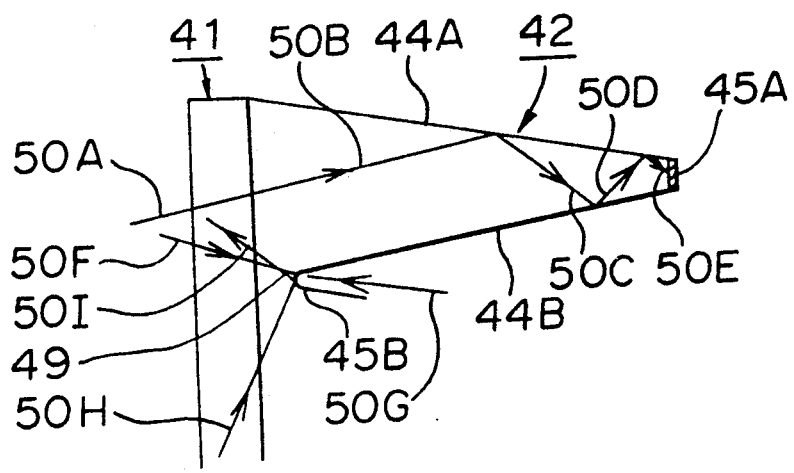
FIGS. 5 and 6 are respectively cross-sectional views which illustrate the propagation of light in the transparent-scattering type optical device of the present invention.

FIG. 5 is a model of a prism showing a state of the total reflection in a prism. Incident light enters obliquely from the observers' side as indicated by arrow marks. A part of the light 50A incident in the prism at an incident angle which is smaller than a specified incident angle which is determined by the prism is reflected at the side faces of the prism; repeats reflection, and finally reaches the absorbing face 45A. If the prism is formed to have an ideal shape, the observer will recognize that light goes straight on the prism at the transparent portion of the transparent-scattering type optical element, and the light incident in the prism at an angle smaller than the specified incident angle which is determined by the refractive index of the prism is absorbed directly or totally reflected, whereby the totally reflected light is absorbed indirectly at the absorbing face at the top or near it. Accordingly, the light does not substantially reach the observers' side at the transparent portion.

When machining accuracy of the prism is low, i.e. the shape of the valley bottom portion is dull, there is no total reflection of light which has reached that portion, but the light passes through it. However, when the absorbing face is provided at the dull valley bottom portion, the light is not reflected but is absorbed, and there is no danger of transmission. Accordingly, the reduction of contrast ratio does not take place.

On the other hand, when the illumination means is disposed at the back side of the transparent-scattering type optical element in accordance with the present invention, light from the illumination means enters through the side faces without having the absorbing faces of the prism, i.e., the side faces near the bottom surface of the prism, to thereby reach the transparent-scattering type optical element. In this case, the incident light emits through the transparent portion of the transparent-scattering type optical element, toward the observers side, at an angle within a specified angle range which is determined by the inclination angle of the side faces and the refractive index of the prism. The incident light is not directly seen by the observer who is in the viewing angle. In this case, however, when the shape of the valley bottom portion of the prism is dull, the light which has reached the dull valley bottom portion is not totally reflected but passes through it. Accordingly, the light of the illumination means at the back side of the prism directly reaches the observer, whereby the contrast ratio is remarkably reduced. In this connection, when the absorbing face is formed at the valley bottom portion, the light is absorbed and there is no danger of transmission.

As described before, when the absorbing face is formed to be dark, any incident light does not substantially reach the observer and a dark color can be provided. However, when the color of the absorbing face is red, blue or green other than black, the light corresponding to that color is recognized.

On the other hand, at the scattering portion of the transparent-scattering type optical element, incident light from the observers' side is scattered. The light of the illumination means at the back side of the optical element enters obliquely into the prism through the side faces and is scattered in the same manner. Of the scattered light, light directing toward the observers' side is recognized to be white by the observer. Thus, the display of black or a specified color and white is obtainable. In this case, in order to obtain a display of black on a white background by using a liquid crystal optical element which controls transparent and scattering states by the application of voltage, it is necessary to use such a liquid crystal display element capable of providing a scattering state without applying the voltage. For the above-mentioned purpose, the liquid crystal optical element having a liquid crystal polymer composite wherein liquid crystal is dispersed and held in a cured matrix, as described before, is most suitably used.

When the color of the colored layer at the absorbing face is rendered to be a color other than black, for instance, the color is red, a display consisting of white and red is obtainable. In addition to this, when a blue light is used for the illumination means at the back side of the liquid crystal optical element, a display of violet and blue is obtainable.

The size of the absorbing face formed on the trigonal prism may be determined depending on the range of viewing angle and the brightness. However, it is preferable, as described before, that the absorbing face covers the area near the top of the side face of the prism having a height of $H_0$ in a range about 30%–70%. When the prism having a trapezoidal shape in cross section is used, the height of a plane at which the top portion of the prism is cut should be in a range of about 30%–70% at the top side of the prism having a height of $H_0$.

The absorbing face at the valley bottom portion which is on the side of the bottom portion of the side faces between the adjacent prisms is formed at the valley bottom portion of the adjacent prisms. Since a large surface area of the absorbing face sacrifices the brightness, the surface area of the absorbing face should be small as possible. Practically, the surface area should be determined in consideration of the deterioration of the characteristics and the reduction of the brightness as well as the productivity.

Figure 4:
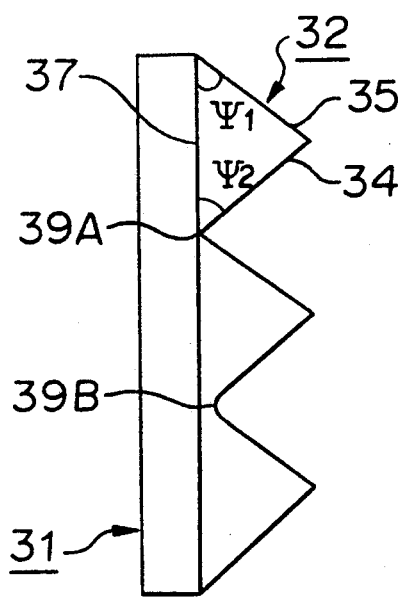

The provision of the absorbing layer at the valley bottom portion of the prism in order to prevent the reduction of the contrast ratio will give a great advantage over the prisms as shown in FIGS. 1 and 2. However, it also provides a great effect when the absorbing layer is formed at the valley bottom portion of the conventional prism as shown in FIGS. 3 and 4.

The illumination means used in the present invention may be a tungsten lamp, a halogen lamp, a metal-halide lamp, a xenon lamp, an LED, an EL or a known illumination device. Further, it may be such a type of illumination device wherein an external light source such as sun light, indoor illumination or the like is utilized. Further, a combination of a reflecting mirror such as flat surface mirror, a spherical surface mirror, an oval surface mirror, a parabolic surface mirror or the like and a light introducing means such as a lens, optical fibers or the like, may be used.

For the transparent-scattering type optical element used for the transparent-scattering type optical device of the present invention, such one that the transmission and scattering can be artificially controlled by using the transparent-scattering optical material layer, may be used. The transparent-scattering type optical element using liquid crystal is more preferably used because of low power consumption and high reliability. The most preferable optical element is such that a liquid crystal cured material composite layer in which liquid crystal is dispersed and held in a cured matrix is placed between a pair of substrate plates with electrodes, and the scattering and transparent states are controlled by the application of voltage.

The liquid crystal cured material composite layer held in the transparent-scattering type optical element may be such that the liquid crystal is dispersed and held in the cured matrix. Specifically, it is of a type that independent liquid crystal droplets are formed and liquid crystal is sealed in the droplets as microcapsules, or the liquid crystal droplets may be communicated with each other, or liquid crystal is filled in a large number of fine openings in the cured matrix.

The above-mentioned liquid crystal cured material composite layer is disposed between the pair of substrate plates with electrodes so that a voltage can be applied across the electrodes. By the application of a voltage, the refractive index of the liquid crystal is changed and the relation between the refractive index of the cured matrix and the refractive index of the liquid crystal is changed. When the refractive index, of the former coincides with that of the latter, a transparent state (incident light goes straight through the optical element) is realized. On the other hand, when the refractive index becomes different, a scattering state (the incident light is scattered) is provided.

Practically, the refractive index of the cured material which, constitutes the cured matrix is made to coincide with the ordinary refractive index $(n_0)$ of the liquid crystal in the state that a voltage is applied thereto. Thus, when the refractive index of the cured material coincides with the refractive index of the liquid crystal material, the light passes through the optical element, whereas when not, the light is scattered (white cloudy). Since the scattering characteristic of the element is higher than that of a conventional DSM (dynamic scattering mode) transparent-scattering type optical element, a high ON-OFF ratio is obtainable.

The liquid crystal cured material composite layer may be formed by preparing a mixture of the liquid crystal and raw materials of the cured matrix and by supplying the mixture on the substrates with electrodes to be cured, or by sealing with a sealing material the periphery of the pair of the substrate plates with electrodes in the same manner as the preparation of an ordinary liquid crystal cell, and by introducing the mixture through an inlet so that the liquid crystal is dispersed and held in the cured matrix.

The cured matrix may be a polymer matrix, a ceramic matrix or the like. Of a cured matrix, the polymer matrix is preferably used because it can be easily manufactured, and adjustment of the refractive index can be made easy.

For the raw material for the polymer matrix, a light curable resin or a heat curable resin which is capable of curing in a closed system is preferably used. The resin is dissolved in the liquid crystal to prepare a solution. Then, the solution is cured by light or heat. It is possible to use either a flow-supplying method or an injection method in consideration of increasing productivity. In particular, it is more preferable to use the light curable resin.

In the curing process for the curable matrix, a part of the optical element can be rendered to be in a normal light transparent state by curing the curable matrix in a state that a sufficiently high voltage is applied to only that part, or by curing the curable matrix by heating that part at a phase transformation point or higher of the liquid crystal. Further, a display of desired half tone (a desired scattering degree in the scattering mode) can be obtained by curing a specified portion of the optical element while an intermediate voltage is applied thereto, or by semi-curing the specified portion in a state that a sufficiently high voltage is applied, followed by completing the curing without the application of voltage. Thus, a display in which a frame or characters are partially fixed, or a display of a picture image can be obtained.

Although it is preferable to completely coincide the refractive index of the cured matrix with the ordinary refractive index ($n_0$) of the liquid crystal used in the transparent-scattering type liquid crystal display element, it is possible to practically use the transparent-scattering type liquid crystal display element in which the above-mentioned refractive indices are substantially met to the extent that there is no adverse effect to the transparent state. A slight difference in matching the refractive indices permits the light to transmit because the resin matrix is swollen owing to the liquid crystal whereby the matching index of polymer matrix approaches the refractive index of the liquid crystal from that inherent in the polymer matrix itself.

The transparent-scattering type optical element is used for a display by patterning the electrodes to have a desired pattern. Alternatively, an active element such as a TFT may be arranged for each picture element to thereby form an assembly of dots so that various kinds of display are obtainable.

The electrodes provided in both substrate plates are normally transparent electrodes. A non-transparent electrode of a material used such as metal may be additionally provided, to use it as a lead wire having a low resistance, for a part of the transparent electrode.

In the present invention, a protective sheet such as a glass sheet or a plastic sheet may be put on the front surface or the rear surface of the transparent-scattering type optical element for the purpose of color adjustment, or a color filter or a colored illumination may be used to obtain a multicolored display pattern.

As the cured matrix which constitutes the before-mentioned liquid crystal cured material composite layer, in particular the raw material for the polymer matrix, there are various kinds of monomer, oligomer, and polymer which are soluble by solvent which constitute a mixture by mixing them with the liquid crystal. In this case, it is preferable to use a homogenized solution obtained by dissolving the raw material of the cured matrix in the liquid crystal. However, a latex may be used.

When a mixture is caused to flow on the substrate plate, the mixture which contains a solvent to be distilled off or which produces a by-product such as gas during the curing may be used. However, when a manufacturing process that the liquid crystal is injected in a cell followed by curing it, is used, a mixture which makes unnecessary the distillation of the solvent in a closed system and is capable of curing without producing the by-product such as gas during the curing, is used.

It is preferable to use the light curable resin to increase productivity as described above. Especially, use of a light curable vinyl type resin is preferred. For instance, a light curable acrylic resin, especially such resin including acryl oligomer which is polymerized and cure by the irradiation of light is exemplified.

For the liquid crystal used in the present invention, there are a nematic liquid crystal, a smetic liquid crystal and so on. They can be used solely or in a form of composition. However, it is advantageous to use a composition in order to satisfy the requisite performance such as operating temperature, operating voltage and so on. In particular, use of the nematic liquid crystal is preferred.

When the light curable resin is used for the liquid crystal polymer composite layer, it is preferable to uniformly dissolve the light curable resin in the liquid crystal. However, the cured material after the exposure of light can not be dissolved or is hardly dissolved. On the other hand, when the composition is used, it is desirable to use the liquid crystal having a closer value in solubility.

When the liquid crystal cured material composite layer is to be prepared, the raw material of the cured matrix and the liquid crystal are mixed to obtain a mixture so that the mixing rate of the cured matrix and the liquid crystal is in a range of about 25:75–75:25 and that the mixture can be used in a form of liquid or viscous material.

When the liquid crystal cured material composite layer is to be prepared, a cell is formed and the mixture is injected through an injection port in the same manner as preparing the conventional liquid crystal display element. However, it is possible to prepare very effectively the transparent-scattering type optical element by supplying the mixture of the raw material of the cured matrix and the liquid crystal on the substrate plates with electrodes and by overlaying the substrate plates so as to oppose to each other. The operable range of the substrate plate gap is 5 $\mu$m–100 $\mu$m. However, it is suitable that the substrate plate gap is in a range of 7 $\mu$m–40 $\mu$m in the case of using the liquid crystal cured material composite layer in consideration of a voltage applied and the contrast at the ON-OFF time. For the transparent-scattering type liquid crystal optical element, dichroic dye, a sole dye, pigment may be added to the liquid crystal, or a colored cured matrix may be used.

By using substrate plates made of a plastic material for the substrate plates with electrodes, a long-sized transparent-scattering type optical element in which a continuous plastic film is used can be easily manufactured.

Since the transparent-scattering type optical element of the present invention has the substantially same size as a conventional liquid crystal display element, there is found substantially no reduction of processing capability even in a case that a cell is prepared using glass plates in the same manner as the conventional liquid crystal display element, followed by injecting the liquid crystal.

Thus, the transparent-scattering type liquid crystal optical element using the liquid crystal cured material composite layer provides advantages as follows. There is a small possibility of causing the short-circuiting of upper and lower transparent electrodes; it is unnecessary to strictly control the orientation of the liquid crystal molecules and the gap between the substrate plates as in an ordinary TN type liquid crystal display element; and it is possible to manufacture with excellent processing capability the transparent-scattering type liquid crystal optical element capable of controlling the transparent state and the scattering state.

The transparent-scattering type liquid crystal element can be driven by the application of an a.c. voltage so as to change the orientation of the liquid crystal. Specifically, an a.c. voltage of 5–100 V at about 10–1,000 Hz is applied to the optical element.

The viewing angle or the color may be changed by disposing a lens, or a filter at the observers' side of the transparent-scattering type optical element.

Referring to FIG. 3, when the eye position of an observer is changed counterclockwise from the direction facing the front of the optical element, light which goes straight on through the transparent portion hits the side face 24 where the light is reflected to hit the absorbing face 25 or the light directly hits the absorbing face 25. In the construction as shown in FIG. 3, the viewing angle of the observer is limited to about 90° downwardly.

On the contrary, when the eye position of the observer is changed clockwisely towards the upper direction, the light going straight hits the side face 24. When the light reaches the specified angle which corresponds to the total reflection critical angle which is determined by the refractive indices of the prism and air behind the prism, the total reflection of the light does not occur at the side face 24, and the light emits backward. In this case, since the light of an illumination means disposed at the back side of the prism also enters, the light of the illumination means is directly recognized by the observer, whereby it is difficult to see an image on the display.

At a portion which exhibits a scattering state in the transparent-scattering optical material layer of the transparent-scattering type optical element 21, light incident from the observers' side and light from the illumination means at the back side of the prism are scattered, and the observer recognizes the scattered light irrespective of the eye position, namely, the observer recognizes a white tone. Thus, a display of white and black is obtainable. The observer has a visible range from nearly 90° in the lower direction to a specified angle which is determined by the refractive indices of the prism and air behind the prism in the upper direction. Specifically, the viewing angle of the upper side of the observer is about 5°-20° and the center of the viewing angle does not come to the front direction.

As described before, the non-directional incident light from the back side permits the effective utilization of only about 30%.

In the prism having an angle of 90° at the top portion as in FIG. 4, since only one side face is used for the entire absorbing face, the viewing angle is not symmetric with respect to the front direction of the optical element.

On the other hand, in the optical elements as shown in FIGS. 1 and 2, the viewing angle of the observer is substantially symmetric with respect to the front direction. In a case of using a trigonal prism having an isosceles triangle in cross section, the viewing angle in the light and left direction (in the direction of depth in the drawing) covers the substantially entire region, and the viewing angle in the vertical direction is equal to or substantially equal to a range from ±30° to ±40°.

The function of the transparent-scattering optical element of the present invention will be described with reference to FIG. 5. In FIG. 5, there is shown in cross section a prism 42 having a trapezoidal shape, in which the propagation of light is illustrated. Assuming that light 50A enters in the prism 42 through the transparent portion of a transparent-scattering type optical element 41 at an angle which is lower than a specified incident angle $\theta$ with respect to the direction of normal line, so that it becomes light 50B propagating the inside of the prism, the light 50B is reflected on side faces 44A, 44B to become light 50C, 50D, 50E, and finally reaches an absorbing face 45A. The light having a smaller incident angle $\theta$ reaches after fewer total reflections or directly the absorbing face 45A. In the case described above, there is no substantial reflection of light. Since light does not enter from the outside in the prism at the total reflection angle, light from the back side does not directly enter to propagate on the opposite side, whereby the display looks dark.

On the contrary, light incident in the prism at an angle greater than the specified incident angle $\theta$ appears outside through the side faces of the prism. Therefore, light from the outside also enters in the prism. In this case, the observer with this viewing angle directly sees the light of the illumination means at the back side of the prism, whereby the observer does not see a dark tone.

Although there is no problem when a valley bottom portion 49 formed between two adjacent prisms is machined ideally, there will exist a great problem if precision in machining of the valley bottom portion is low or the size of the prisms is extremely small so that the shape of the valley portion is necessarily dull. In this case, light 50F which has entered into the valley bottom portion from the observers' side will be reflected on the side face 44B if the valley bottom portion is precisely formed (and it is absorbed at the absorbing face 45A after repeating reflection). However, when the shape of the valley bottom portion is dull and there is no absorbing face 45B, the light 50F emits outside.

On the other hand, light 50G from the outside also enters into the prism. Accordingly, the portion which has to show a dark tone looks bright. Since the shape of the valley bottom portion is in a part of circle, light 50H which will pass through the side face of the prism if the absorbing face 45B is not provided at the valley bottom portion causes reflection, whereby light 50I reaches the observers' side. However, in this invention, the light is absorbed at the absorbing face 45B and does not reach the observers' side. Thus, by providing the absorbing face at the valley bottom portion, a phenomenon that a portion which has to provide a dark tone looks bright, whereby contrast ratio is decreased, hardly occurs.

Use of the prism as shown in FIG. 1 instead of the prism in FIG. 2 provides the substantially same function. Accordingly, the depth of the prism as in FIG. 2 is smaller than that of the FIG. 1 prism and the surface area of the absorbing face can also be reduced so that the size of the optical device can be small and the manufacturing can be easy.

The prism as shown in FIGS. 1 or 2 can be used for a reflection type display apparatus by covering the area other than the absorbing face of the side faces of the prism with a reflection layer which reflects light to the inside of the prism. In this case, light entering in the prism at an angle smaller than a specified incident angle $\theta$ from the observers' side is absorbed when the light reaches the absorbing face 45A in the same manner as the case that no reflection layer is formed. On the contrary, since the light entering in the prism at an angle greater than the specified incident angle $\theta$ is reflected on the side faces of the prism, the light comes toward the observers' side after it has repeated reflection. In this case, since the emitting angle corresponds to the incident angle, the observer having the eye position within the viewing angle which corresponds to an angle smaller than the incident angle $\theta$ does not see the light of illumination, and the display looks dark. However, the observer in the viewing angle region which corresponds to an angle greater than the incident angle $\theta$ recognizes the light of illumination means, and the display does not appear dark. With the above-mentioned arrangement, when the observer is in the eye position within the viewing angle which corresponds to an angle smaller than the incident angle $\theta$, the display appears to be dark if the picture elements are in a transparent state. When the picture elements are in a scattering state, the light returned from the prism side is again scattered so that the display appears to be more bright.

Figure 6:
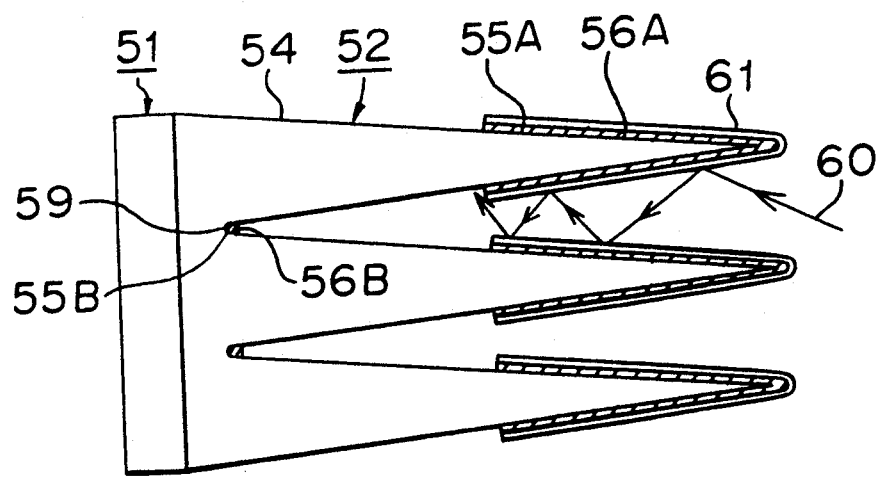

FIG. 6 shows another embodiment of the transparent-scattering type optical element in cross section wherein a reflection layer is formed on the absorbing face so that the light is reflected outward and that the light of the illumination means at the back side of the prism can be effectively used.

In FIG. 6, an outwardly reflecting reflection layer 61 is formed on the outer surface of the colored layer 56A of an absorbing face 55A so that the light 60 from an illumination means at the back side of the optical element is reflected on the reflection layer and enters into the prism through the side face of the prism where no absorbing layer is formed. The embodiment of FIG. 6 improves the efficiency of utilization of the light of the illumination means at the back side of the optical element, and a bright display is possible.

In this embodiment, there is no reflection layer on the colored layer 56B of an absorbing face 55B at the valley bottom portion because the surface area of the outer surface of the colored layer 56B is relatively small, and accordingly, the surface area for reflection is small while the process of forming the reflection layer is troublesome, and a great improvement in brightness can not be achieved. In the present invention, however, the reflection layer may be formed on the colored layer 56B.

FIGS. 7A, 7B, 7C and 7D are respectively cross-sectional views showing other embodiments of the present invention.

Figure 7:
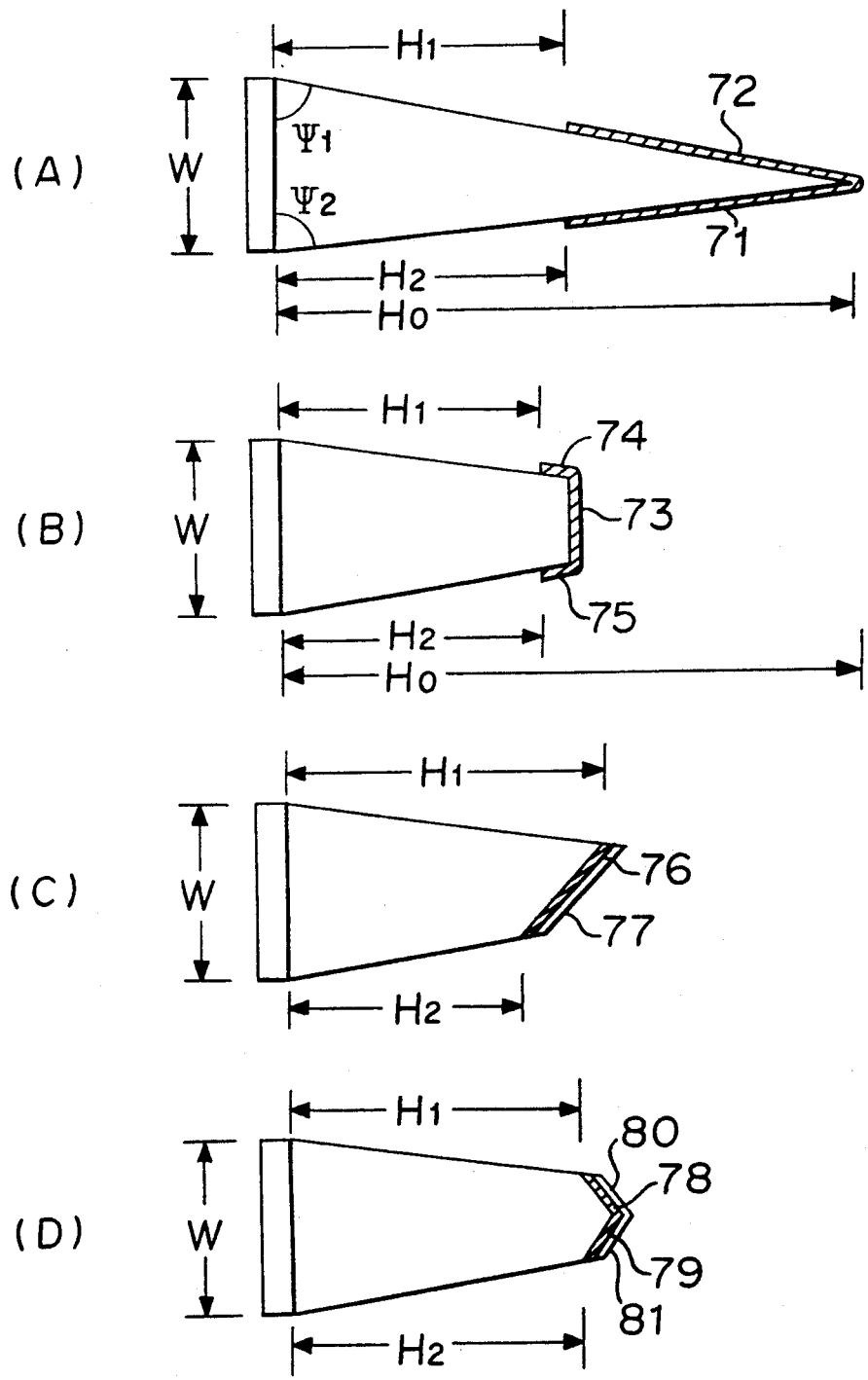
FIGS. 7(A)-7(D) are a cross-sectional views showing another embodiment of the transparent-scattering type optical device of the present invention.

FIG. 7A shows an embodiment of the optical device having a relation of $\Psi_1 < \Psi_2$. The position of absorbing faces 71, 72 on the side faces of the prism is the same ($H_1 = H_2$). Accordingly, the viewing angle is not completely symmetric. A symmetric viewing angle can be obtained by adjusting the absorbing face on the side face to be asymmetric. In this case, the relation between $H_1$ and $H_2$ depends on the figure of the prism.

FIG. 7B shows a prism with the top portion which is cut so as to be parallel to the bottom surface, i.e., the prism having a trapezoidal shape in cross section. In this embodiment, the absorbing faces 73, 74, 75 cover not only the upper surface of the prism but also a part of the both faces. In this embodiment too, the relation of $H_0$ (the distance from the bottom surface to the crossing point of extension lines along the both surfaces) to $H_1$ or $H_2$ is in a range of 30%–70%, in the same manner as described before.

FIG. 7C shows a prism having a cut face which is formed by cutting the top portion so as not to be in parallel to the bottom surface, and the cut face functions as an absorbing face 76. In this embodiment too, the relation of $H_0$ (the distance from the bottom surface to the crossing point of extension lines extending along the both faces) to $H_1$ or $H_2$ is in a range of 30%–70% as described before. In this specific embodiment, an outwardly facing reflection layer 77 is formed on the absorbing face 76.

FIG. 7D shows a prism having a cut face which is formed by cutting the top portion so as not to be in parallel to the bottom surface, and the cut face has a ridge portion where absorbing faces 78, 79 are formed. In this specific embodiment, outwardly facing reflection faces 80, 81 are formed on the absorbing faces 78, 79.

The ridge portion of the prism as shown in FIG. 7D may be modified to have an arch shape in cross section, or it may be a combination of other shapes.

Several Examples of the present invention will be described. However, the present invention is not limited to these Examples.

EXAMPLES 1–4

Two glass plates with ITO electrodes which are patterned so as to be capable of displaying a numeral of modified 8 (7 segment type) were prepared, and an empty cell having 20 $\mu$m gap was formed by interposing a spacer having a dimeter of 20 $\mu$m and by sealing with a sealing material.

7 parts of 2-ethylhexylacrylate, 15 parts of 2-hydroxyethylacrylate, 24 parts of acryloligomer ("M-1200" produced by Toa Gosei Kagaku K. K.), 0.9 part of "Dalocure-1116" by Merk as a photo-curing initiator, and 64 parts of liquid crystal ("E-8" by BDH Company) were uniformly dissolved to prepare a mixture of liquid crystal. The mixture of liquid crystal was introduced in the empty cell, followed by irradiating ultraviolet rays for 30 seconds to thereby prepare a transparent-scattering type liquid crystal optical element. In the thus prepared transparent-scattering type liquid crystal optical element, the refractive index of the cured polymer which constitutes a polymer matrix was substantially equal to the ordinary refractive index ($n_0$) of the liquid crystal. Accordingly, the refractive indices of the both materials were different under the condition that no voltage was applied, whereby the optical element exhibited a scattering (white cloudy) state. When an a.c. voltage (AC35 V, 50 Hz) was applied across the given electrodes, only that portion exhibited a transparent state.

A trigonal prism of acryl having an isosceles triangle in cross section and having a relation of $\Psi_1 = \Psi_2 = 86°$ (refractive index = 1.50, the width of bottom surface W = 10 mm, and the length from the bottom surface to the top portion: $H_0 = 71.5$ mm) was prepared. A black coating was applied to the both side faces near the top portion of the prism ($H_1 = H_2 = 37$ mm) to form absorbing faces.

The prism was closely attached to a transparent-scattering type liquid crystal optical element in the same manner as shown in FIG. 1. Investigation on the viewing angle revealed about $\pm 90°$ in the right and left (in the direction of depth in the drawing) direction with respect to the axial direction of the trigonal prism and about $\pm 30°$ in the vertical direction. When there is a parallel light from the back side, the device thus formed showed a brightness of about 50% at the scattering portion in a case without using a prism. The contrast ratio (CR) was about 15. In a case that the prism was machined with low precision, the contrast ratio was greatly reduced to about 5. When the brightness and the contrast ratio were measured in a case that the low precision prism was used and a black coating having a width of about 1 mm was applied to the valley bottom portion to use it as an absorbing face, the brightness was reduced by about 10% and the contrast ratio was remarkably improved.

A result of Examples 2-4 in which the prism of the same material was used but the prism took various shapes as shown in Table 1.

colored layer of the absorbing face were used. It was revealed that an amount of light from the back side was increased and was effectively used, and any of the devices showed brightness in comparison with the case without forming the reflection layer.

TABLE 1

| | | | | | | High percision prism | | Low precision prism | |
|---|---|---|---|---|---|---|---|---|---|
| | | | | | | Without absorbing layer at the valley bottom portion | | Without absorbing layer at the valley bottom portion | With absorbing layer at the valley bottom portion |
| No. | Ψ ° | $H_0$ mm | $H_1$ mm | W mm | Viewing angle ± ° | Brightness % | Contrast ratio | Contrast ratio | Contrast ratio |
| 1 | 86.0 | 71.5 | 37.0 | 10 | 30 | 49 | 15 | 5 | 20 |
| 2 | 85.0 | 57.2 | 28.0 | 10 | 30 | 49 | 15 | 5 | 20 |
| 3 | 81.0 | 31.6 | 14.0 | 10 | 30 | 44 | 15 | 5 | 20 |
| 4 | 80.0 | 28.4 | 10.0 | 10 | 30 | 35 | 15 | 5 | 20 |

When low precision prisms were used, the contrast ratios were greatly reduced, and the light of the illumination means at the back side was directly seen depending on the eye position. However, when the black coating having a width of about 1 mm was applied to the valley bottom portion to form an absorbing face, the contrast ratios were greatly improved.

In Example 1, the prism having the number of reflection of 4 times or lower (FIG. 5) was used, and in Examples 2-4, prisms having the number of reflection of three times or lower, two times or lower and 1 times or lower were respectively used.

EXAMPLES 5-8

The transparent-scattering type liquid crystal optical devices were prepared in the same manner as that of Example 1 except that prisms of flint glass having a high refractive index (refractive index=1.84) were used instead of the acrylic prism. A result of investigation on the viewing angle is shown in Table 2.

EXAMPLES 17-24

The optical devices were prepared in the same manner as those of Examples 1-8 except that prisms having their bottom surface were square and absorbing faces near the top of the four side faces of square cone-like prism which was symmetric with respect to the axial center were used instead of the trigonal prisms. A result of investigation on the viewing angle is shown in Table 3.

TABLE 3

| | | | | | | High percision prism | | Low precision prism | |
|---|---|---|---|---|---|---|---|---|---|
| | | | | | | Without absorbing layer at the valley bottom portion | | Without absorbing layer at the valley bottom portion | With absorbing layer at the valley bottom portion |
| No. | Ψ ° | $H_0$ mm | $H_1$ mm | W mm | Viewing angle ± ° | Brightness % | Contrast ratio | Contrast ratio | Contrast ratio |
| 17 | 86.0 | 71.5 | 37.0 | 10 | 30 | 77 | 15 | 5 | 20 |
| 18 | 85.0 | 57.2 | 28.0 | 10 | 30 | 74 | 15 | 5 | 20 |
| 19 | 81.0 | 31.6 | 14.0 | 10 | 30 | 69 | 15 | 5 | 20 |
| 20 | 80.0 | 28.4 | 10.0 | 10 | 30 | 58 | 15 | 5 | 20 |
| 21 | 86.2 | 75.3 | 38.4 | 10 | 45 | 76 | 15 | 5 | 20 |
| 22 | 84.8 | 54.9 | 29.1 | 10 | 40 | 78 | 15 | 5 | 20 |
| 23 | 82.2 | 36.5 | 19.7 | 10 | 35 | 79 | 15 | 5 | 20 |
| 24 | 76.2 | 20.4 | 10.2 | 10 | 30 | 75 | 15 | 5 | 20 |

In comparison with the devices of Examples 1-8, the viewing angle in the right and left direction became the same as that in the vertical direction, but the brightness was remarkably improved.

EXAMPLES 25-32

Prisms having a triangular shape in cross section were prepared in the same manner as described in Examples 1-8 except that the portion at which an absorbing face was to be formed, was cut so as to be in parallel to the

TABLE 2

| | | | | | | High percision prism | | Low precision prism | |
|---|---|---|---|---|---|---|---|---|---|
| | | | | | | Without absorbing layer at the valley bottom portion | | Without absorbing layer at the valley bottom portion | With absorbing layer at the valley bottom portion |
| No. | Ψ ° | $H_0$ mm | $H_1$ mm | W mm | Viewing angle ± ° | Brightness % | Contrast ratio | Contrast ratio | Contrast ratio |
| 5 | 86.2 | 75.3 | 38.4 | 10 | 45 | 51 | 15 | 5 | 20 |
| 6 | 84.8 | 54.9 | 29.1 | 10 | 40 | 53 | 15 | 5 | 20 |
| 7 | 82.2 | 36.5 | 19.7 | 10 | 35 | 54 | 15 | 5 | 20 |
| 8 | 76.2 | 20.4 | 10.2 | 10 | 30 | 50 | 15 | 5 | 20 |

In Example 5, the prisms having the number of reflection of 5 times or lower was used, and in Examples 6-8, the prisms having the number of reflection of 4 times or lower, 3 times or lower, or 2 times or lower were respectively used.

EXAMPLES 9-16

The same prisms as those of Examples 1-8 except that a reflection layer was formed at the outer surface of the bottom surface. Namely, prisms having a trapezoidal shape in cross section as shown in FIG. 2 were prepared. A colored layer was formed on the absorbing face of each of the prisms.

With the prisms having a trapezoidal shape, evaluation is conducted on the prisms in the same manner the evaluating method described in the Examples 1-8. As a result, the viewing angle and the brightness were the same as those of the Examples 1-8. Since the depth was $H_1$ (equal to $H_2$) of the prisms, the dimension (depth) required for packaging was greatly reduced so that the miniaturization of the optical device could be easy. Even when a non-directional backlight was used, a shadow due to the absorbing face formed at the top portion of each of the prisms was small and there was no reduction in brightness in comparison with Examples 1-8.

EXAMPLES 33-40

Prisms having a triangular shape in cross section were prepared in the same manner as described in Examples 17-24 except that the portion at which an absorbing face was to be formed, was cut so as to be in parallel to the bottom surface. Namely, prisms having a trapezoidal shape in cross section as shown in FIG. 2 were formed. A colored layer was formed on the absorbing face of each of the prisms. Evaluation was conducted on the prisms having a trapezoidal shape in the same manner as Examples 17-24. As a result, the viewing angle and the brightness were the same as those in Examples 17-24. Since the dimension (depth) was $H_1$ (equal to $H_2$) of the prisms, the dimension required for packaging was greatly reduced so that the miniaturization could be easy. Even when a non-directional backlight was used, a shadow due to the absorbing face formed at the top portion of each of the prisms was small, and there was no reduction in brightness in comparison with Examples 17-24.

EXAMPLES 41 and 42

Prisms were prepared in the same manner as that of Example 32 except that $\Psi_1=75.6°$, $\Psi_2=90°$, the width W of the bottom surface=10 mm and the top portion of each of the prisms (having the length between the bottom surface and the top: $H_0=39$ mm was cut at positions of $H_1=H_2=14$ mm. Black color coating was conducted on the top surface of each of the prisms to thereby form an absorbing face.

The prisms had a viewing angle of 57° in the upper direction and an viewing angle of 30° in the lower direction. The brightness was 37% in a case of a trigonal prism, and the brightness was 59% in a case of a square cone-like prism. The brightness was reduced by about 10% by forming an absorbing layer at the valley bottom portion. However, a high contrast ratio could be obtained even by using a prism machined with low precision.

EXAMPLE 43

A prism was prepared in the same manner as Example 1 except that $\Psi_1=84.2°$, $\Psi_2=78.5°$, the width of the bottom surface W=10 mm, and the top portion of the prism (having the distance between the bottom surface and the top portion: $H_0=32.8$ mm) was cut at positions of $H_1=16.7$ mm and $H_2=14.1$ mm. Black color coating was conducted to the both side faces of the prism to thereby form absorbing faces.

The prism had a viewing angle of 30° each in the upper and lower directions. The brightness was 45%. When an absorbing layer was formed at the valley bottom portion, the brightness was reduced by about 10%. However, a high contrast ratio could be obtained even by using a prism machined with low precision.

EXAMPLE 44

A prism was prepared in the same manner as described in Example 43 except that as shown in FIG. 7C, the top portion of the prism was cut at positions of $H_1=16.7$ mm and $H_2=14.1$ mm and the surface of the upper inclined portion was coated with a black color to thereby form an absorbing face. In addition, a reflection layer of aluminum was formed on the absorbing face.

The viewing angle of the prism was the same as that of Example 43. Use of parallel light and non-directional light exhibited the same brightness of about 45%. However, the brightness was further improved in a room having a much amount of light incident from the upper direction. When an absorbing layer was formed at the valley bottom portion, the brightness was reduced by about 10%. However, a high contrast ratio could be obtained even by using a prism machined with low precision.

EXAMPLE 45

A prism was prepared in the same manner as described in Example 25 except that as shown in FIG. 7B, the top portion was cut at positions of $H_1=H_2=45$ mm (but not $H_1=H_2=37$ mm); absorbing faces were formed not only on the entire upper surface but also on the side faces to the positions of $H_1=H_2=37$ mm, and the absorbing faces were covered by a white paint.

The prism had the same viewing angle as Example 25. However, the brightness was further improved.

EXAMPLE 46

A prism was prepared in the same manner as described in Example 25 except that as shown in FIG. 7D, the top portion was cut at positions $H_1=H_2=37$ mm so that the prism had the peak portion having a height of 45 mm, whereby absorbing faces were formed in the entire ridge portion which comprised two upper surfaces.

The prism had the same viewing angle and brightness as those of Example 25.

EXAMPLE 47

A transparent-scattering type liquid crystal optical device was prepared by using a transparent-scattering type liquid crystal optical element in which TFTs (thin film transistors) were formed for each picture element in a matrix form instead of a transparent-scattering type liquid crystal optical element with ITO electrodes which were arranged by patterning to have a display having a numeral of a modified 8.

The prism used was made of acryl and had a symmetric square cone-shape with a square bottom surface wherein $\Psi_1(=\Psi_2)=81°$, $H_0=3.16$ mm, $H_1(=H_2)=1.4$ mm, W=1 mm, the valley bottom portion of the prism was formed to have a height of about 1 mm from the bottom surface, and the valley bottom portion was formed to have a part of circle having diameter of 0.2 mm. The prism had absorbing faces at the top surface which were formed by cutting the top portion in parallel to the bottom surface and the valley bottom portion (having a width of about 0.2 mm) as shown in FIG. 2.

The display apparatus had a viewing angle of ±30° each in the vertical direction and right and left direction. The contrast ratio in display was 10 or higher. In a case that parallel light from the back side was given, the brightness was about 50% of that of the scattering portion in comparison with no prism disposed. In comparison with a prism subjected to ideal machining, the contrast ratio and the viewing angle were the same as those of the prism although the brightness was reduced theoretically by about 25%.

As an Comparative Example, a display apparatus was prepared by using a prism which had no absorbing face at the valley bottom portion of the prism. The Comparative Example showed a narrow viewing angle and a contrast ratio reducing to about 5. Further, an observer recognized the light of the illumination means at the back side directly at certain positions even within the proper range of viewing angle.

EXAMPLE 48

The same transparent-scattering type liquid crystal optical element as the Example 47 was used, but the prism was replaced by another. As the prism, a trigonal prism of acryl having an isosceles triangular shape in cross section was used wherein $\Psi_1(=\Psi_2)=85°$, $H_0=5.7$ mm, $H_1(=H_2)=1.4$ mm, $W=0.5$ mm, the valley bottom portion was formed at a position having a height of about 0.5 mm from the bottom surface, and the valley bottom portion was formed to have a part of circle having a diameter of 0.1 mm. The valley bottom portion of the prism was machined with fairly high precision. However, since the size of the prism was fairly small, it was impossible to completely eliminate the influence of the valley bottom portion. This prism, absorbing faces were formed as shown in FIG. 1 at portions, near the top of the prism, of both the side faces and at the valley bottom portion (having a width of about 0.1 mm).

The display apparatus had a viewing angle of $\pm 30°$ in the vertical direction and a viewing angle of $\pm 90°$ in the right and left direction. The contrast ratio for display was 10 or higher. In a case that parallel light is given from the back side, the brightness was about 40% of that at the scattering portion in comparison with no prism disposed. In comparison with a prism subjected to ideal machining, the contrast ratio and the viewing angle were the same as the ideally machined prism although the brightness was reduced by about 20% theoretically.

EXAMPLE 49

A pure reflection type display apparatus was prepared by using the prism of Example 47 except that the side faces of the prism were covered by aluminum reflection layers and light was directed from the front of the liquid crystal optical element. The viewing angles were $\pm 30°$ in the vertical direction and right and left direction respectively. The contrast ratio was 10 or higher. In a case that parallel light was given from the observers' side, the brightness was about 5 times as large as the brightness at the scattering portion in comparison with the case where no prism is used. However, when there was no one- to -one correspondence between the picture element of the transparent-scattering type liquid crystal optical element and the prism, there was found influence in a display state by a neighboring picture elements when the optical element is driven. Accordingly, the quality in a half-tone (gray-scale) display was more or less inferior in comparison with the display apparatus of Example 47. However, when the picture element and the prism were made in a one to one correspondence relation, there was found no substantial influence in a display state by the neighboring picture elements.

Thus, in accordance with the present invention, the viewing angle of an observer can be set to be in the area substantially in front of the transparent-scattering type optical element, the loss in the light of an illumination means can be small, a bright display and a high contrast ratio can be obtained by combining the above-mentioned transparent-scattering type optical element which can control electrically a scattering state and a transparent state, a prism of a type that the shape in cross section of the prism is triangular or of a type that a part including the top of the triangular shape in cross section is cut wherein the angles $\Psi_1$, $\Psi_2$ formed between each side face of the prism and the bottom surface are respectively $65° \leq \Psi_1 \leq 90°$ and $65° \leq \Psi_2 \leq 90°$ and either of $\Psi_1$ and $\Psi_2$ is not an angle of 90°, and wherein an area including the top and the neighborhood of it functions as an absorbing face, and the above-mentioned illumination means.

Further, in accordance with the present invention desired characteristics such as viewing angle and contrast ratio can be obtained even by using a low precision prism consisting of a plurality of small-sized prisms connected in series and having dull valley bottom portions by combining a transparent-scattering type optical element which can control electrically a scattering state and a transparent state, a prism having a triangular shape in cross section or a triangular shape in cross section in which a part of the top is cut and having a valley bottom portion which functions as a absorbing face, and an illumination means.

For the illumination means, a conventional backlight may be used or external light, such as sun light or room light, may be used. Further, if light having strong directivity in the combination of a reflection mirror, a lens or the like is supplied, further bright display is possible. Further, the present invention can be utilized for a reflection type display device wherein a display is presented by light coming from the front direction.

Since the prism with its top portion cut is used, the depth of the display device can be reduced to thereby make the entire size of the device small while a bright display having a white background can be easily obtained. Accordingly, the display apparatus of the present invention can be suitably used for indicators for home electric apparatuses, lap-top personal computers, word processors, TVs and so on.

In the transparent-scattering type liquid crystal optical element using a liquid crystal polymer composite in which liquid crystal is dispersed and held in a polymer matrix, transparent and scattering are controlled by controlling the refractive index. Accordingly, the incident light is not absorbed in the polarization film, the brightness is more than two times as clear as a conventional TN type liquid crystal display element, there causes slight temperature rise in the transparent-scattering type optical element and it provides high reliability.

It is possible for the present invention to be applied in various fields in a range without impairing its function.

Obviously, numerous modifications and variations of the present invention are possible in light of the above teachings. It is therefore to be understood that within the scope of the appended claims, the invention may be practiced otherwise than as specifically described herein.

What is claimed is:

1. A transparent-scattering type optical device comprising:

a transparent-scattering type optical element, said element
comprising a transparent-scattering mode optical material layer whose light scattering characteristics are changed in response to an external input; and
at least one prism having a bottom surface attached to a back surface of said transparent-scattering type optical element,
wherein said prism has a longitudinal cross section of a shape which is either triangular or triangular with a top portion cut away, and
wherein first and second angles formed by the two sides of the triangular longitudinal cross section of the prism and said bottom surface are each between 65° and 90°, inclusive, such that one of said angles does not equal 90°, and
wherein an area defined by portions of side surfaces of the prism nearest to the top of the prism or, when the top portion is cut away, a portion of a top face of the prism functions as absorbing faces or an absorbing face, respectively.

2. The transparent-scattering type optical device according to claim 1, wherein said prism has a trigonal prism-like body, and the first and second angles formed by the two sides of the triangular longitudinal cross section of the prism and the bottom surface are between 65° and 87°, inclusive.

3. The transparent-scattering type optical device according to claim 2, wherein said first and second angles are between 75° and 87°, inclusive.

4. The transparent-scattering type optical device according to claim 1, wherein said prism has a pyramidal body or a cone body, and
wherein the first and second angles formed by the sides of the longitudinal cross section of the pyramidal body or the cone body and the bottom surface are between 65° and 87°, inclusive.

5. The transparent-scattering type optical device according to claim 4, wherein said first and second angles are between 75° and 87°, inclusive.

6. The transparent-scattering type optical device according to claim 1, wherein said prism is a polygonal prism with a top portion cut away, and
wherein the surface of the prism formed by the cut-away part functions as an absorbing face.

7. The transparent-scattering type optical device according to claim 6, wherein said polygonal prism is a trapezoidal prism,
wherein an upper face thereof formed by the cut-away part functions as an absorbing face.

8. The transparent-scattering type optical device according to claim 1, wherein said prism is formed so as to have the relations $$0.30 \leq H1/H0 \leq 0.70 \text{ and } 0.30 \leq H2/H0 \leq 0.70,$$

where H0 is a length from the bottom surface of the prism to the top, and H1 and H2 are respective lengths from the bottom surface to lower edges of the absorbing faces.

9. The transparent-scattering type optical device according to claim 1, wherein two or more prisms are provided in a side-by-side relation, and
a recessed valley portion formed between a pair of adjacent prisms functions as an absorbing face.

10. The transparent-scattering type optical device according to claim 1, wherein an illumination means is disposed so as to face the top portion of said prism.

11. The transparent-scattering type optical device according to claim 1, wherein a reflection face which reflects light to an inside region of said prism is formed on said side surfaces as a non-absorbing face of said prism.

12. The transparent-scattering type optical device according to claim 1, wherein said transparent-scattering mode optical material layer of the transparent-scattering type optical device is a liquid crystal cured material composite layer in which liquid crystal is dispersed and held in a matrix of cured material.

13. The transparent-scattering type optical device according to claim 12, wherein said liquid crystal cured material composite layer of the transparent-scattering type optical device is formed so that the refractive index of the liquid crystal is changed in the presence or absence of a voltage applied thereto, and so that when the refractive index of the liquid crystal coincides with the refractive index of the cured material matrix, light passes through the liquid crystal cured material composite layer, and when the refractive index of the liquid crystal and the refractive index of the cured material matrix do not coincide, the light is scattered.

14. The transparent-scattering type optical device according to claim 1, for use in a display device.

15. A transparent-scattering type optical device comprising:
a transparent-scattering type optical element, said element comprising a transparent-scattering mode optical material layer whose light scattering characteristics are changed in response to an external input; and
two or more prisms having a same bottom surface attached to the back surface of said transparent-scattering type optical element, wherein said prisms each have a longitudinal cross section of a shape which is either triangular or triangular with a top portion cut away, and
wherein said prisms are provided in a side-by-side relation and the recessed valley portion formed between a pair of adjacent prisms functions as an absorbing face.

16. The transparent-scattering type optical device according to claim 15, for use in a display device.

17. A transparent-scattering type display apparatus comprising:
a transparent-scattering type optical element, said element comprising a transparent-scattering mode optical material and having patterned electrodes,
wherein light scattering characteristics of said element are changed at each of the electrodes in response to an external input, and a display image of said element is formed according to the operation of said patterned electrodes; and
at least one prism having a bottom surface attached to the back surface of said transparent-scattering type optical element,
wherein said prism has a longitudinal cross section of a shape which is either triangular or triangular with a top portion cut away, and
wherein first and second angles formed by two sides of the triangular longitudinal cross section of the prism and said bottom surface are each between 65° and 90°, inclusive, such that one of said angles does not equal 90°, and wherein an area defined by portions of the side surfaces of the prism nearest to the top of the prism or, when the top portion is cut away, a portion of the top face of the prism, functions as absorbing faces or an absorbing face, respectively.

18. The transparent-scattering type display apparatus according to claim 17, wherein the at least one prism is two or more prisms provided in a side-by-side relation and a recessed valley portion formed between a pair of adjacent prisms functions as an absorbing face.

19. The transparent-scattering type display apparatus according to claim 17, wherein an active element is used for the transparent-scattering type optical element.

20. The transparent-scattering type display apparatus according to claim 19, wherein the active element used for the transparent-scattering type optical element is a thin film transistor.

* * * * *